United States Patent
Clark et al.

(10) Patent No.: US 11,097,482 B2
(45) Date of Patent: Aug. 24, 2021

(54) SYSTEM AND METHOD FOR FORMING NANO-STRUCTURES ON SUBSTRATES TO PROVIDE PREDETERMINED PHYSICAL CHARACTERISTICS TO THE SUBSTRATES

(71) Applicant: Xerox Corporation, Norwalk, CT (US)

(72) Inventors: Timothy J. Clark, Weedsport, NY (US); Yiyi Guan, Pittsford, NY (US); Robert P. Herloski, Webster, NY (US); John C. Juhasz, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 355 days.

(21) Appl. No.: 15/940,073

(22) Filed: Mar. 29, 2018

(65) Prior Publication Data
US 2019/0299528 A1   Oct. 3, 2019

(51) Int. Cl.
*B29C 64/273* (2017.01)
*B33Y 10/00* (2015.01)
*B33Y 30/00* (2015.01)
*B29C 64/135* (2017.01)
*B29C 64/393* (2017.01)
*B33Y 50/02* (2015.01)
*G02B 26/10* (2006.01)
*G02B 26/08* (2006.01)

(52) U.S. Cl.
CPC .......... *B29C 64/273* (2017.08); *B29C 64/135* (2017.08); *B29C 64/393* (2017.08); *B33Y 10/00* (2014.12); *B33Y 30/00* (2014.12); *B33Y 50/02* (2014.12); *G02B 26/0833* (2013.01); *G02B 26/105* (2013.01)

(58) Field of Classification Search
CPC ... B29C 64/135; B29C 64/273; B29C 64/393; B33Y 10/00; B33Y 30/00; B33Y 50/02; G02B 26/0833; G02B 26/101; G02B 26/105
See application file for complete search history.

(56) References Cited

U.S. PATENT DOCUMENTS

| 8,685,185 B2 | 4/2014 | Guo et al. |
| 9,690,092 B2 | 6/2017 | Freedman et al. |
| 2008/0186551 A1* | 8/2008 | Hanft .................. G02B 7/10 359/205.1 |
| 2017/0165914 A1* | 6/2017 | Czaplewski .......... B29C 64/264 |

(Continued)

FOREIGN PATENT DOCUMENTS

JP    H1190669 A  *  4/1994  ......... B23K 26/0643

OTHER PUBLICATIONS

Paschotta, Rudiger, Ultaviolet Light, Mar. 13, 2008, Encyclopedia of Laser Physics and Technology (Year: 2008).*

(Continued)

*Primary Examiner* — Michael M. Robinson
*Assistant Examiner* — Victoria Bartlett
(74) *Attorney, Agent, or Firm* — Maginot Moore & Beck LLP

(57) ABSTRACT

A three-dimensional (3D) object printer includes a surface treatment system configured to treat layers of an object being formed by the printer with a moving ultraviolet (UV) laser. The movement of the laser is controlled with a scanning mirror system and the spot size of the laser is reduced with a focus lens having a numerical aperture in a range of about 0.5 to about 1.0.

12 Claims, 2 Drawing Sheets

(56) References Cited

U.S. PATENT DOCUMENTS

| | | | |
|---|---|---|---|
| 2017/0227180 A1* | 8/2017 | Anderson | G03B 21/2033 |
| 2018/0186082 A1* | 7/2018 | Randhawa | B23K 26/34 |
| 2018/0272600 A1* | 9/2018 | Shaarawi | C04B 35/491 |
| 2019/0193204 A1* | 6/2019 | Houbertz | B29C 64/135 |
| 2020/0189143 A1* | 6/2020 | Brandt | C04B 35/803 |

OTHER PUBLICATIONS

Chunlei Guo; University of Rochester, Newscenter Archives; Jan. 21, 2015-Feb. 23, 2018; 6 Pages; University of Rochester, Rochester, NY, USA; http://www.rochester.edu/newscenter/tag/chunlei-guo/.

Lyons et al.; Fabricating Superhydrophobic Surfaces with Solid Freeform Fabrication Tools; International Journal of Rapid Manufacturing; Jan. 2013; pp. 488-497.

Wang et al.; Surface Modification of Polystyrene by Femtosecond Laser Irradiation; Journal of Laser Micro/Nanoengineering; Jul. 2016; pp. 253-256; vol. 11, Issue 2.

UV-Curable Hybrid Polymers for Micro Optical Components; Micro Resist Technology GmbH; Jan. 2017; 3 Pages; www.microresist.com.

\* cited by examiner

SYSTEM AND METHOD FOR FORMING NANO-STRUCTURES ON SUBSTRATES TO PROVIDE PREDETERMINED PHYSICAL CHARACTERISTICS TO THE SUBSTRATES

TECHNICAL FIELD

This disclosure relates generally to systems for altering physical properties of surfaces on three-dimensional (3D) objects, and more particularly, to such systems that alter physical properties using lasers.

BACKGROUND

Surface treatments of various materials are known to enhance the ability of the materials to repel water, attract water, or other physical properties without adding coatings to the materials. All known treatments require multi-step processes or chemical surface modifications to be performed on the surfaces of existing objects. Additionally, selective treatments of an object's surface would enable the altered or enhanced property to be patterned on the surface to conform to a particular purpose for the object.

In some additive manufacturing systems, also known as 3D object printers, the build materials used to form an object can be precisely controlled to eject very small drops of the build material to form structures that alter the properties of a surface. This precise control adds a level of complexity to the system and may require numerous ejectors that eject drops of different sizes to help form micro and macro features appropriately. Thus, surface treatment systems and 3D printers that are simpler and that provide selective surface treatment to produce altered or enhanced physical properties for objects would be beneficial.

SUMMARY

A new printer includes a surface treatment system that enables treatment of individual layers during formation of an additive manufactured article as well as selective treatment of areas within the layers. The printer includes a platen, a plurality of printheads, at least one printhead in the plurality of printheads being configured to eject drops of a build material toward the platen to form an object on the platen, a plurality of actuators operatively connected to the platen, the actuators in the plurality of actuators being configured to move the platen along three orthogonal axes bidirectionally and to rotate the platen about two of the orthogonal axes bidirectionally, the two orthogonal axes about which the platen rotates being within a plane parallel to the platen, a surface treatment module, the surface treatment module being configured to move a pulsed, focused laser beam onto at least one position on a layer of the object being formed by the 3D object printer, and a controller operatively connected to the plurality of actuators, the plurality of printheads, and the surface treatment module. The controller is configured to operate the actuators in the plurality of actuators to move the platen along three orthogonal axes bidirectionally with two of the orthogonal axes being within the plane parallel to the platen, to operate the printheads in the plurality of printheads to eject drops of the build material toward the platen to form the object on the object, and to operate the surface treatment module to place the pulsed, focused laser beam on the at least one position on the layer of the object to alter a physical property of the layer at the least one position.

A method of operating a surface treatment system enables treatment of individual layers during formation of an additive manufactured article as well as selective treatment of areas within the layers. The method includes operating actuators in a plurality of actuators with a controller to move a platen along three orthogonal axes bidirectionally with two of the orthogonal axes being within the plane parallel to the platen, operating printheads in a plurality of printheads to eject drops of UV curable build material and support material toward the platen to form an object on the platen, and moving a focused, pulsed UV laser beam to predetermined locations on a layer of the object being formed by the 3D object printer to cure the build material at the predetermined locations and alter a physical property of the layer at the predetermined locations.

A new surface treatment module enables treatment of individual layers during formation of an additive manufactured article as well as selective treatment of areas within the layers. The surface treatment module includes a pulsed laser source configured to produce a pulsed, focused laser beam, a plurality of actuators operatively connected to the pulsed laser source, and a controller operatively connected to the plurality of actuators and the pulsed laser source. The controller is configured to operate the actuators in the plurality of actuators to move the pulsed laser source to predetermined locations over a layer of an object being produced by a 3D object printer and to operate the pulsed laser source to place the pulsed, focused laser beam onto the predetermined locations on the layer of the object to alter a physical property of the layer at the predetermined locations.

BRIEF DESCRIPTION OF THE DRAWINGS

The foregoing aspects and other features of a surface treatment system and a method of operating a surface treatment system that enables treatment of individual layers during formation of an additive manufactured article as well as selective treatment of areas within the layers are explained in the following description, taken in connection with the accompanying drawings.

DETAILED DESCRIPTION

Figure 1:
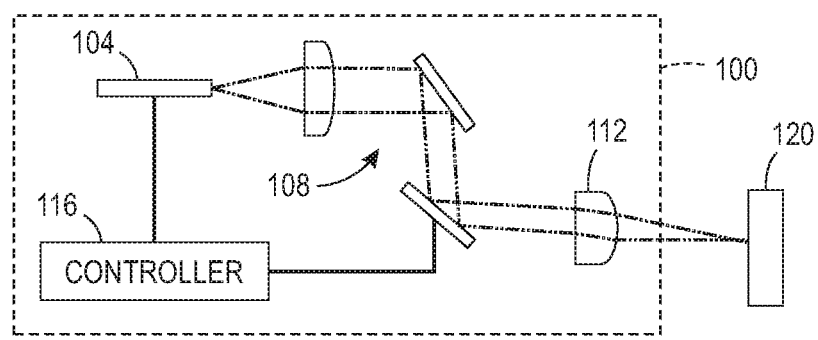
FIG. 1 is a schematic diagram of a surface treatment system that uses a focused laser beam and a scanning mirror system to treat areas of a surface selectively.

For a general understanding of the present embodiments, reference is made to the drawings. In the drawings, like reference numerals have been used throughout to designate like elements.

FIG. 1 is a block diagram of a surface treatment system 100. The system 100 includes a pulsed ultraviolet (UV) laser source 104, a scanning mirror system 108, and a focus lens 112. The UV pulsed laser source 104 emits a pulsed laser beam having a wavelength in a range of about 200 nm to about 400 nm. The duration of the beam pulses is set with reference to a signal from the controller 116. The scanning mirror system 108 is a micro-electro-mechanical system (MEMS) or a Galvo scanning mirror system. These scanning mirror systems are known in the art. The scanning mirror system 108 receives the laser beam from the source 104 and can be operated by a controller 116 to direct the pulsed laser beam at a particular location on a substrate 120 for surface treatment of the location on the substrate. Between the scanning mirror system 108 and the substrate 120 is a focusing lens 112. The diameter d of a diffraction limited spot of the laser beam that can be produced by the lens 112 can be approximately calculated by the formula d=0.61*λ/NA, where NA is the numerical aperture of the focusing lens. The focus lens 112 has a numerical aperture in a range of about 0.5 to about 1.0 for UV wavelength lasers. For example, a laser beam having a wavelength of about 300 nm passing through a focus lens having a numerical aperture of 0.65 produces a spot size of about 0.28 μm.

The focused spot of a UV curing laser on an uncured or partially cured layer of an object being formed in a 3D printer produces a micro or nano-structure, such as a protrusion or pillar, at the site. These changes affect the physical properties of the layer at the spot and enhance the ability of the affected area to repel or attract water. Additionally, other characteristics of the laser beam can be changed to affect the structures produced by the beam. The size of the laser spot can be altered by changing the distance between the UV pulsed laser source and the lens beyond or short of the focal distance. Additionally, the effect of the UV laser spot can be affected by the amount of time that the spot is held on the area. This exposure time is regulated by the controller 204 setting the pulse duration of the laser. By controlling the movement, the distance between the pulsed UV laser source and the lens, and the pulse duration of the UV laser beam over a layer of an object, the controller 116 can produce pulsed laser beams with different to for different structural features in a layer. Thus, for example, the controller can form different water channels in an area that is otherwise hydrophobic or produce water barriers in an area that is otherwise hydrophilic, depending upon the type of material being treated and the characteristics of the beam used to form the structures. The remainder of the layer can be cured by a broader beam of radiation without adversely impacting the integrity of the micro and nano-structures.

Figure 2:
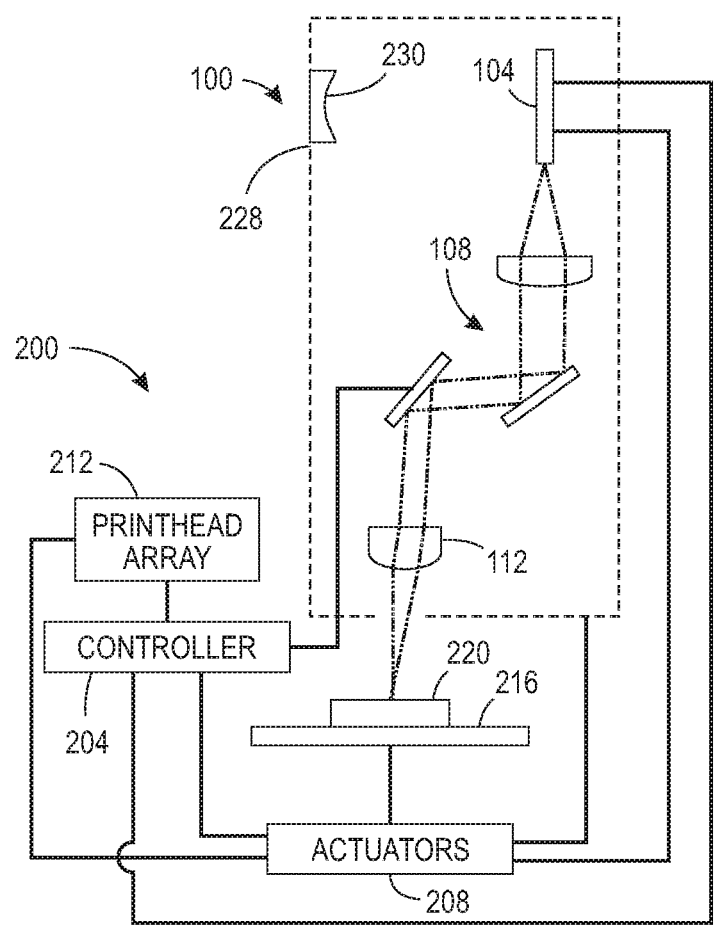
FIG. 2 is a block diagram of a three-dimensional (3D) object printing system that includes the surface treatment system of FIG. 1 to enable treatment of individual layers of an object as the object is being printed.

A 3D object printing system 200 is shown in FIG. 2 that incorporates the surface treatment system 100 shown in FIG. 1. The 3D object printer 200 includes a controller 204 to operate the components of the printer. The 3D object printer 200 includes one or more actuators 208, a printhead array 212, a platen 216, and a surface treatment module 100. The actuators 208, the surface treatment module 100, and the printhead array 212 are operatively connected to the controller 204. The printhead array 212 has a plurality of printheads that are fluidically connected to sources of materials and are configured to eject drops of these materials toward the platen 216 to form the object 220 layer by layer. As used in this document, the word "printhead" means a component having a plurality of ejectors configured to eject drops of a UV curable material. The material ejected by an ejector is dependent upon the material source to which the ejector is fluidically connected. In the printer 200, one or more printheads are configured to eject drops of build material and one or more printheads are configured to eject drops of support material. The build material, as known in the art, is material that remains part of the 3D object being formed, while support material is material that supports the weight of object features during manufacture of the object, but is removed once the object is completely formed. The controller 204 is operatively connected to the printhead array 212 and is configured with programmed instructions that uses data corresponding to the object to be manufactured to operate the ejectors in the printheads of array 212 and form the object layer-by-layer. The data corresponding to the object to be manufactured can be CAD data of the object or the like.

The controller 204 of the printer 200 is also configured with programmed instructions that uses data corresponding to the object to be manufactured to operate the actuators 208. The actuators are operatively connected to the platen 216 and move the platen in an X-Y plane that extends into and out of the plane of FIG. 1 and bidirectionally toward and away from the printhead array 212. These degrees of freedom enable the platen and the object on the platen to be moved bidirectionally in the orthogonal directions X, Y, and Z with the X and Y axes being perpendicular to one another in a plane parallel to the top surface of the platen 216.

In one alternative embodiment, the actuators 208 are operatively connected to the printhead array 212 to enable the printhead array to move with the degrees of freedom described above to enable the ejectors of the printheads to eject UV curable material drops onto portions of the object 220. In another embodiment, both the printhead array 212 and the platen 216 are operatively connected to actuators 208 to enable the controller to move both the printheads in the printhead array and the platen for printing of the object 220. In another alternative embodiment, the printhead array is a multi-nozzle extruder. In a multi-nozzle extruder, each nozzle is independently supplied with material to enable build, support, conductive, and electrically insulating materials to be extruded to manufacture the object 220 and form electrical circuits on the object.

The controller 204 is also configured to operate the actuators 208 to coordinate the movement of the printhead array 212 and the surface treatment module 100. As the 3D object printer 200 is forming an object, surface treatment of a layer may be required. To perform such treatment, the controller 204 operates the actuators 208 to move the printhead array 212 away from the object 220, move the surface treatment system 100 opposite the object 220, and activate the pulsed UV laser source 104 of the surface treatment system 100. The controller 204 is configured to generate signals to set the pulse characteristics of the laser beam from the source 104 and to adjust the distance between the UV laser source 104 and the lens 112. The controller 204 operates the scanning mirror system to direct the pulsed UV laser beam to a predetermined location on the exposed uncured or partially cured layer of the object 220. Again, the focus lens 112 has a numerical aperture that produces a spot size for the laser beam that is in the micrometer or nanometer range. The controller 204 further operates the scanning mirror system 108 to move the pulsed beam along the exposed layer of the object 220 to form micrometer or nanometer structures on the layer, such as hydrophilic or hydrophobic areas. Once the surface treatment is finished, the controller 204 can operate the actuators 208 to move the surface treatment system 100 away from the object 220, return the printhead array 212 to a position opposite the object 220, and deactivate the UV radiation source 104 so formation of the next layer in the object can commence. Additionally, another UV radiation source can be provided that is moved opposite the object 220 to cure the layer, if the controller 204 determines that the layer should be cured. Alternatively, the controller 204 can operate the actuators 208 to turn the surface treatment system 100 so the window 228 is opposite the object 220 and then turn the pulsed UV laser source 104 so the pulsed UV laser is directed through window 228 to cure the layer. In this embodiment, the mode of operation of the UV laser source 104 is changed so the laser produces a steady beam and, in some cases, the frequency of the beam is changed as well since a pulsed beam in the 200 nm to 400 nm range may require a lengthy amount of time to cure the uncured or partially cured material. In this embodiment, the beam of the UV laser passes through a diverging lens 230 in the window 228 so it is broader than the beam produced by the lens 112. This broader UV beam is moved over the uncured areas of the layer to cure the uncured areas of the layer. After the layer is cured, the surface treatment module 100 is removed from being opposite the layer and the printhead array 212 is returned to a position opposite the object 220 for formation of the next object layer. This next layer or some subsequent layer can require surface treatment to provide a different surface treatment characteristic. In some objects, the treated areas of one layer can fluidly communicate with treated areas on another layer so an object can be formed that enables a fluid to move throughout the layers of the object.

Figure 3:
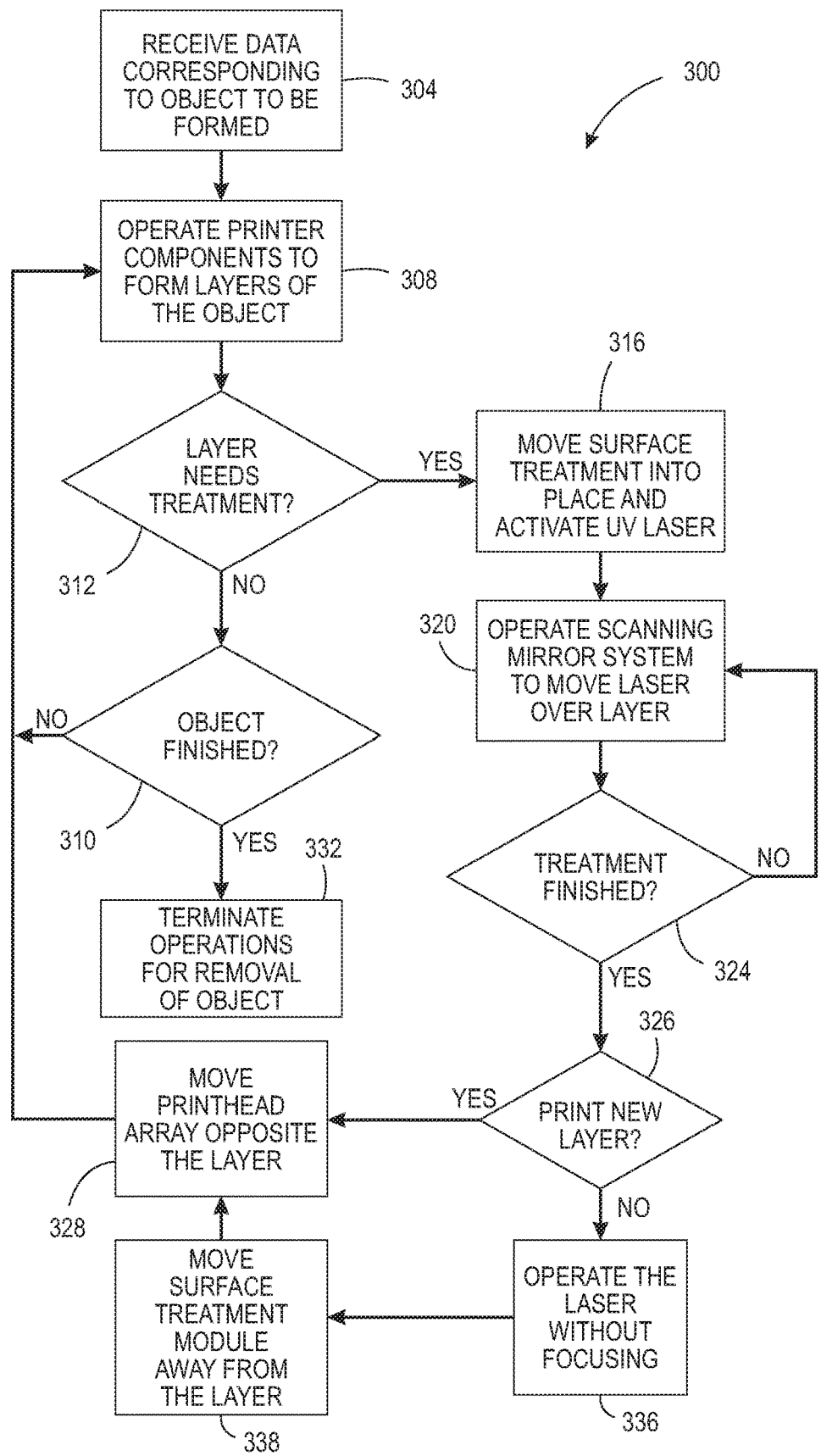
FIG. 3 depicts a process for operating the surface treatment system of FIG. 1.

A process for operating the 3D object printer of FIG. 2 is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 204 noted above can be such a controller or processor. Alternatively, the controller can be implemented with more than one processor and associated circuitry and components, each of which is configured to form one or more tasks or functions described herein. Additionally, the steps of the process may be performed in any feasible chronological order, regardless of the order shown in the figures or the order in which the processing is described.

FIG. 3 is a flow diagram of a process 300 that operates the 3D object printer 200 to different layers of an object being formed by the printer to be surface treated. The process 300 begins with the printer 200 receiving data corresponding to the object to be formed (block 304). The controller 204 operates the actuators 208 and the printhead array 212 to eject drops of materials to form object 220 on the platen 216 (block 308). When a layer of the object 220 requires surface treatment to alter or enhance a physical property of the layer in predetermined areas (block 312), the process moves the printhead array away from the object, moves the surface treatment system opposite the object, and activates the pulsed UV laser source 104 in the surface treatment system 100 to produce a focused, pulsed UV laser spot (block 316). The process operates the scanning mirror system 108 to move the UV beam to predetermined locations on the exposed layer of the object after the UV beam has been focused by the focus lens 112 (block 320). After the predetermined locations on the exposed layer have been treated by the focused laser beam (block 324), the process determines whether to proceed with printing layers or to cure the current layer (block 326). If printing is to resume, then the printhead array is returned to a position opposite the object and the UV radiation spot source is deactivated (block 328) so formation of the object continues (block 308). Otherwise, the pulsed UV laser beam source is moved to direct the beam through the diffusing window of the module so the broader beam cures the uncured material or another UV curing laser with a broader beam is used to finish the curing of the layer (block 336). The surface treatment module 100 is then moved away from the layer and the printhead array is returned to a position opposite the object so layer printing can continue (block 332). The layer constructions and, if necessary, surface treatments continue until the object is completed (blocks 308 to 310) and the operations of the printer and the surface treatment system are terminated so the object can be removed from the 3D printer (block 332).

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A three-dimensional (3D) object printer comprising:
   a platen;
   a plurality of printheads, at least one printhead in the plurality of printheads being configured to eject drops of a build material toward the platen to form an object on the platen;
   a plurality of actuators operatively connected to the platen, the actuators in the plurality of actuators being configured to move the platen along three orthogonal axes bidirectionally and to rotate the platen about two of the orthogonal axes bidirectionally, the two orthogonal axes about which the platen rotates being within a plane parallel to the platen;
   a surface treatment module, the surface treatment module having:
      a laser source;
      a focus lens;
      a diverging lens, the surface treatment module being configured to move the laser source to a first position at which the laser source directs a laser beam to the focus lens along a first path that does not pass through the diverging lens to form a pulsed, focused laser beam onto at least one position on a layer of the object being formed by the 3D object printer and to move the laser source to a second position at which the laser source directs the laser beam to the diverging lens along a second path that does not pass through the focus lens to broaden the laser beam and form a beam for curing a portion of the layer of the object that is larger than the at least one position that received the pulsed, focused laser beam; and
   a controller operatively connected to the plurality of actuators, the plurality of printheads, and the surface treatment module, the controller being configured to operate the actuators in the plurality of actuators to move the platen along three orthogonal axes bidirectionally with two of the orthogonal axes being within the plane parallel to the platen, to operate the printheads in the plurality of printheads to eject drops of the build material toward the platen to form the object on the platen, to operate at least one of the actuators to move the laser source in the surface treatment module to the first position and operate the laser source to form the pulsed, focused laser beam on the at least one position on the layer of the object to alter a physical property of the layer at the least one position and to move the laser source in the surface treatment module to the second position to form the beam that cures the portion of the layer of the object.

2. The 3D object printer of claim 1 wherein the laser source is an ultraviolet (UV) laser source, the UV laser source being configured to produce a pulsed UV laser beam having a wavelength of about 200 nm to about 400 nm; and
   the surface treatment module further comprising:

a scanning mirror system located along the first path, the scanning mirror system being configured to receive the UV laser beam from the UV laser source and direct the UV laser beam to the focus lens to form a pulsed, focused UV laser beam; and the controller being operatively connected to the scanning mirror system, the controller being further configured to:

operate the scanning mirror system to move the pulsed, focused UV laser beam formed by the focusing lens to predetermined locations on the layer of the object being formed by the 3D object printer.

3. The 3D object printer of claim 2 wherein the scanning mirror system is a micro-electro-mechanical system (MEMS) scanning mirror system.

4. The 3D object printer of claim 2 wherein the scanning mirror system is a Galvo scanning mirror system.

5. The 3D object printer of claim 2 wherein the focus lens has a numerical aperture in a range of about 0.5 to about 1.0.

6. The 3D object printer of claim 5, the controller being further configured to:

alter a distance between the pulsed UV laser source and the focus lens, and a pulse duration of the UV laser beam.

7. A surface treatment module for a 3D object printer comprising:

a pulsed laser source;
a focus lens;
a diverging lens;
a plurality of actuators operatively connected to the pulsed laser source; and
a controller operatively connected to the plurality of actuators and the pulsed laser source, the controller being configured to operate the actuators in the plurality of actuators and the pulsed laser source to move the pulsed laser source to a first position and operate the pulsed laser source to direct a laser beam into the focus lens along a first path that does not pass through the diverging lens to form a pulsed, focused laser beam and to move the pulsed, focused laser beam to predetermined locations over a layer of an object being produced by a 3D object printer to alter a physical property of the layer at the predetermined locations and to move the pulsed laser source to a second position and operate the pulsed laser source to direct the laser beam into the diverging lens along a second path that does not pass through the focus lens to form a beam that cures a portion of the layer of the object that is larger than any of the predetermined locations that received the pulsed, focused beam.

8. The surface treatment module of claim 7 wherein the pulsed laser source is an ultraviolet (UV) laser source, the UV laser source being configured to produce a pulsed UV laser beam having a wavelength of about 200 nm to about 400 nm; and the surface treatment module further comprises:

a scanning mirror system located along the first path, the scanning mirror system being configured to receive the pulsed UV laser beam from the UV laser source; and the controller being operatively connected to the scanning mirror system, the controller being further configured to operate the scanning mirror system to move the focused, pulsed UV laser beam to the predetermined locations on the layer of the object being formed by the 3D object printer.

9. The surface treatment module of claim 8 wherein the scanning mirror system is a micro-electro-mechanical system (MEMS) scanning mirror system.

10. The surface treatment module of claim 8 wherein the scanning mirror system is a Galvo scanning mirror system.

11. The surface treatment module of claim 8 wherein the focus lens has a numerical aperture in a range of about 0.5 to about 1.0.

12. The surface treatment module of claim 11, the controller being further configured to:

alter a distance between the pulsed UV laser source and the focus lens and an amount of pulse duration of the pulsed UV laser beam.

* * * * *